(12) United States Patent
Appelquist et al.

(10) Patent No.: US 6,428,460 B1
(45) Date of Patent: Aug. 6, 2002

(54) SUPPORT DEVICE FOR A CENTRIFUGAL SEPARATOR PROVIDING AXIAL AND RADIAL SUPPORT

(75) Inventors: Håkan Appelquist, Huddinge; Jouku Pitkämäki, Tumba, both of (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 09/601,978
(22) PCT Filed: Feb. 17, 1999
(86) PCT No.: PCT/SE99/00214
§ 371 (c)(1), (2), (4) Date: Aug. 10, 2000
(87) PCT Pub. No.: WO99/42221
PCT Pub. Date: Aug. 26, 1999

(30) Foreign Application Priority Data

Feb. 19, 1998 (SE) .............................................. 9800489

(51) Int. Cl.⁷ ................................................ B04B 9/14
(52) U.S. Cl. ......................................... 494/82; 384/535
(58) Field of Search ............................. 494/12, 38, 43, 494/82–85; 68/23.3; 210/144, 363; 384/428, 441, 535, 536, 581, 582; 464/180, 181; 74/572, 574

(56) References Cited

U.S. PATENT DOCUMENTS

| | | | |
|---|---|---|---|
| 847,009 A | * | 3/1907 | Knudsen |
| 1,980,580 A | * | 11/1934 | Gilmore |
| 2,015,784 A | * | 10/1935 | Brown |
| 2,141,122 A | * | 12/1938 | Boden |
| 2,141,145 A | * | 12/1938 | Wooler et al. |
| 2,149,728 A | * | 3/1939 | Cronan |
| 2,487,343 A | * | 11/1949 | Kopf |
| 2,534,738 A | * | 12/1950 | Scott |
| 2,556,317 A | * | 6/1951 | Cook |
| 2,689,769 A | * | 9/1954 | Ware, Jr. |
| 2,698,131 A | * | 12/1954 | Cook |
| 2,725,188 A | * | 11/1955 | Scott |
| 2,827,229 A | * | 3/1958 | Blum |
| 2,829,016 A | * | 4/1958 | Hirst |
| 2,906,572 A | * | 9/1959 | Wroby |
| 3,003,831 A | * | 10/1961 | King et al. |

(List continued on next page.)

FOREIGN PATENT DOCUMENTS

| | | | |
|---|---|---|---|
| CA | 495910 | * | 9/1953 |
| CA | 502919 | * | 5/1954 |
| CH | 345204 | * | 4/1960 |
| DE | 1 028 836 | | 4/1958 |
| DE | 1 069 431 | | 11/1959 |
| DE | 1089506 | * | 9/1960 |
| DE | 1 204 948 | | 11/1965 |
| DE | 2434810 | * | 3/1975 |
| DE | 2624951 | * | 12/1977 |
| DE | 4033592 | * | 5/1992 |

(List continued on next page.)

Primary Examiner—Charles E. Cooley
(74) Attorney, Agent, or Firm—Fish & Richardson P.C.

(57) ABSTRACT

The invention refers to a support device for a centrifugal separator having a centrifuge rotor (2), which is provided in a frame (1) to be rotatable about an axis (x) of rotation by use of a bearing member (4). The support device is provide between the bearing member and the frame and permits relative movements between the rotor and the frame. The support device has two first stiff portions (6', 6") which are substantially immovable in relation to the bearing member, two intermediate elastic portions (7', 7") and two second stiff portions (1', 1") which are substantially immovable in relation to the frame. The first stiff portions, seen in an axial section, adjoin a respective intermediate portion along a first borderline (8', 8") and the second stiff portions, seen in the axial section, adjoin a respective intermediate portion along a second borderline (9', 9"). At least one of the second borderline slopes in relation to the axis (x) and the extensions of the second borderlines (9', 9"), which extensions are directed outwardly from the axis, intersect.

26 Claims, 3 Drawing Sheets

U.S. PATENT DOCUMENTS

| | | | |
|---|---|---|---|
| 3,301,612 | A * | 1/1967 | Thomas |
| 3,306,679 | A * | 2/1967 | Stokely |
| 3,606,143 | A * | 9/1971 | Stallmann |
| 3,664,151 | A * | 5/1972 | Pause |
| 3,709,570 | A * | 1/1973 | Galbato |
| 3,743,365 | A * | 7/1973 | Kato |
| 3,779,451 | A * | 12/1973 | Lehman |
| 4,334,718 | A * | 6/1982 | Hirt et al. |
| 4,384,858 | A * | 5/1983 | Kronert et al. |
| 4,513,566 | A * | 4/1985 | Rajsigi et al. |
| 4,556,331 | A * | 12/1985 | Munde et al. |
| 4,568,324 | A * | 2/1986 | Williams |
| 4,722,618 | A * | 2/1988 | Matsumoto et al. |
| 4,734,079 | A * | 3/1988 | Viets |
| 4,779,483 | A * | 10/1988 | Andra et al. |
| 4,910,502 | A * | 3/1990 | Serveau et al. |
| 5,026,341 | A * | 6/1991 | Giebeler |
| 5,328,408 | A * | 7/1994 | Wolf et al. |
| 5,342,282 | A * | 8/1994 | Letourneur |
| 5,352,157 | A * | 10/1994 | Ochs et al. |
| 5,407,282 | A * | 4/1995 | Bade et al. |
| 5,573,461 | A * | 11/1996 | Colford |
| 5,666,862 | A * | 9/1997 | Eckel et al. |
| 5,800,070 | A * | 9/1998 | Nilsson et al. |
| 5,827,959 | A * | 10/1998 | Howell |
| 5,848,959 | A * | 12/1998 | Droste et al. |
| 5,971,908 | A * | 10/1999 | Scheuber et al. |
| 6,224,533 | B1 * | 5/2001 | Bengtsson et al. |
| 6,228,016 | B1 * | 5/2001 | Kristensen et al. |
| 6,354,988 | B1 * | 3/2002 | Carson et al. ............ 494/82 |

FOREIGN PATENT DOCUMENTS

| | | | |
|---|---|---|---|
| DE | 43 14 440 | | 6/1994 |
| EP | 71026 | * | 2/1983 |
| EP | 585516 | * | 3/1994 |
| EP | 585529 | * | 3/1994 |
| FR | 690685 | * | 9/1930 |
| FR | 712677 | * | 10/1931 |
| FR | 884 635 | | 8/1943 |
| FR | 1 089 663 | | 3/1955 |
| FR | 1 263 432 | | 5/1961 |
| GB | 339767 | * | 12/1930 |
| GB | 813237 | * | 5/1959 |
| GB | 917124 | * | 1/1963 |
| JP | 63-225717 | * | 9/1988 |
| SE | 137 768 | | 10/1952 |
| WO | 89/10794 | * | 11/1989 |

* cited by examiner

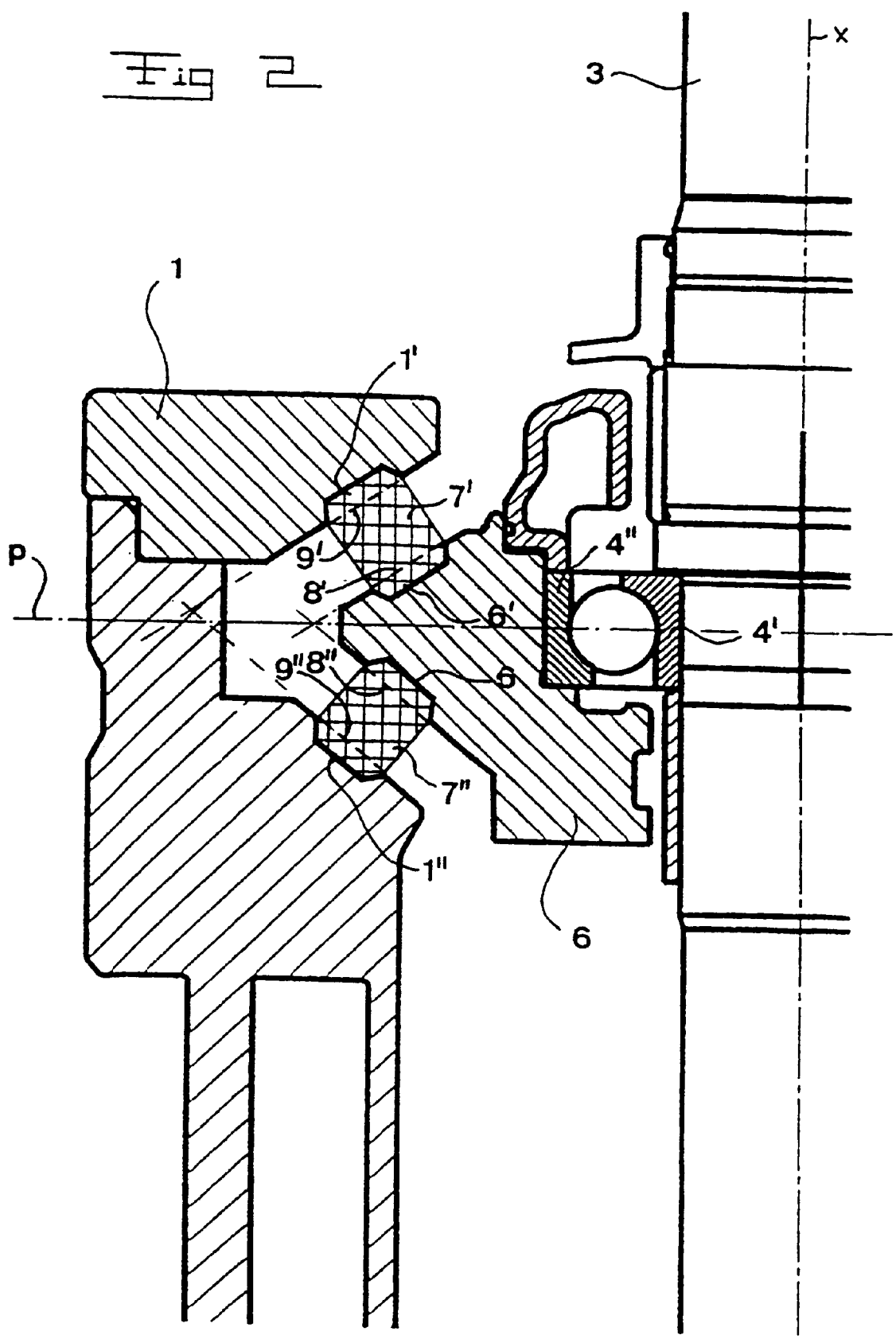

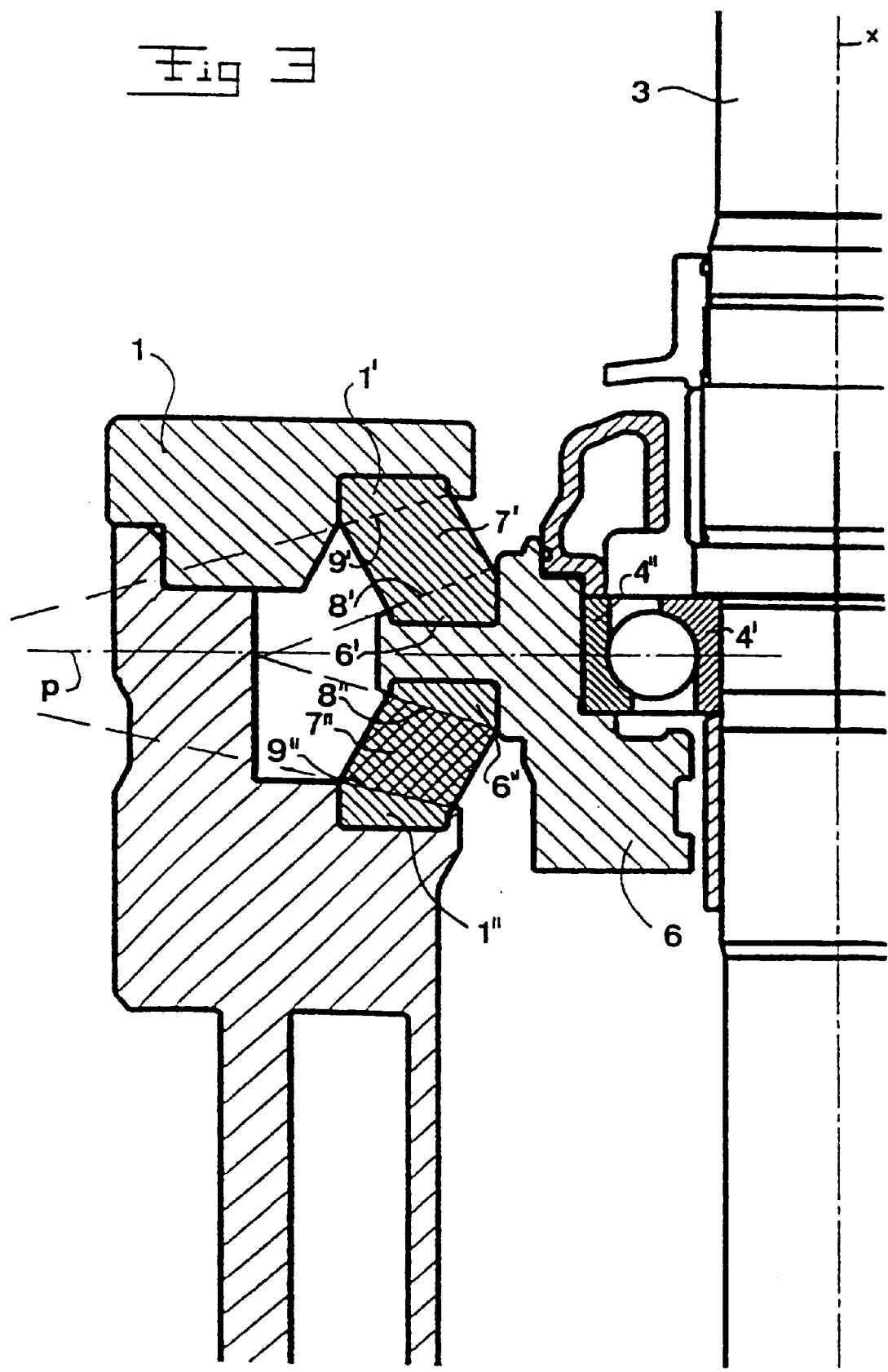

SUPPORT DEVICE FOR A CENTRIFUGAL SEPARATOR PROVIDING AXIAL AND RADIAL SUPPORT

FIELD OF THE INVENTION

The present invention refers to a support device for a centrifugal separator having a centrifuge rotor, which is provided in a frame member to be rotatable about an axis of rotation by means of at least one bearing member having a middle plane, wherein the axis of rotation is substantially perpendicular to the middle plane of the bearing member, wherein the support device is arranged to be provided between the bearing member and the frame member and to permit relative movements between the centrifuge rotor and the frame member, and comprises two first substantially stiff portions which are substantially immovable in relation to the bearing member, two intermediate elastic portions and two second substantially stiff portions which are substantially immovable in relation to the frame member, and wherein the two first stiff portions seen in an axial section adjoin a respective intermediate portion along a first borderline and the two second stiff portions seen in said axial section adjoin a respective intermediate portion along a second borderline.

BACKGROUND OF THE INVENTION

Such support devices of centrifugal separators, and in particular for the so-called neck bearing of the centrifugal separator, are to present a certain resiliency, i.e. to permit radial and axial relative movements between the frame member and the centrifuge rotor. Thereby, it is important that the support device has a stiffness, which is low enough to maintain the forces acting on the neck bearing on a low level. Large forces acting on the neck bearing reduce the lifetime thereof. However, the support device may not be too weak since the critical number of revolutions of the centrifuge rotor in that case will be too low, which results in a risk for instability and large oscillating movements. Thus, the support device is to present a sufficient but not too high stiffness in a radial as well as an axial direction. In addition to permit such relative movements, the support device also is to have a certain damping effect in the radial as well as the axial direction.

It is known to provide such a resiliency and damping by means of a number of steel spring buffers, which are provided around the neck bearing. Such steel spring buffers comprise a helical spring by which a desired elasticity or resiliency may be provided. By permitting the spring buffers to slide against a surface connected to the bearing member or the frame member, a certain damping may be obtained. However, by such spring buffers the support device becomes complicated as a whole and requires a relatively extensive mounting work.

Furthermore, it is known to utilize rubber elements extending as a ring about the whole rotor spindle or being provided as separate rubber elements about the rotor spindle in order to support the centrifuge rotor. The rubber elements existing today are arranged to permit shearing of the rubber as a result of radial relative movements. The spring constant of the rubber with respect to compression forces is, however, relatively large whereas the spring constant with respect to shearing forces is relatively small. Consequently, such rubber elements have a relatively high axial stiffness and a relatively low radial stiffness. If, in such constructions, one tries to increase the stiffness by choosing a harder rubber (higher shore number), problems frequently occur since the quality of a rubber which is sufficiently hard is unsatisfactory, i.e. the through hardness of the rubber element available varies and in addition such hard rubber ages faster.

SE-B-137 768 discloses a centrifugal separator having a centrifuge rotor, which is provided in a frame member to be rotatable about an axis of rotation by means of a bearing member. The known separator comprises a support device, which is provided between the bearing member and the frame member, and permits relative movements between the centrifuge rotor and the frame member. The support device comprises a radially inner stiff portion, an intermediate elastic portion of rubber and a radially outer stiff portion, wherein the intermediate portion is arranged to receive radial relative movements by a pure compressing of the rubber. The support device also comprises an axially upper stiff portion, an axially intermediate elastic portion of rubber and an axially lower stiff portion wherein the intermediate portion is arranged to receive radial relative movements by a substantially pure shearing of the rubber.

FR-A-884 635 discloses different designs of a support device for a neck bearing for a centrifuge rotor of a centrifugal separator. According to one embodiment, the support device comprises an annular rubber element which has an L-shape seen in an axial section and which thus extends radially outwardly and axially downwardly from the bearing to permit and damp axial as well as radial movements, i.e. tilting or pivoting movements.

DE-B-1 069 431 discloses a support device for a centrifuge rotor. According to the embodiment disclosed, the support device comprises two intermediate elastic portions. The support device is displaced along the axis of rotation with respect to the bearing.

FR-A-1 263 432 discloses another support device for a centrifuge rotor. The device comprises two intermediate elastic portions forming borderlines to the respective stiff portions. The borderlines extend in a radial plane with respect to the axis of rotation.

SUMMARY OF THE INVENTION

The object of the present invention is to provide a constructively simple support device, which is arranged to permit relative movements between the centrifuge rotor and the frame member, and to provide damping of these movements. In particular, the support device is to be designed in such a manner that a desired spring constant and a desired damping may be obtained in a simple manner in axial as well as radial direction.

This object is obtained by the support device initially defined, which is characterized in that at least one of said second borderlines slopes in relation to the axis of rotation, that the extensions of the second borderlines, which extensions are directed outwardly from the axis of rotation, intersect, and that the two intermediate portions are provided on a respective side of the middle plane. By such an elastic or resilient portion, which is arranged in such a manner that an outer borderline slopes in relation to the axis of rotation, i.e. has an angle to the axis of rotation which is larger than 0° and less than 90°, the deformation arising in the elastic portion will comprise both a compressing and a shearing deformation of the elastic element. By choosing the angle of inclination by which said second borderline slopes, the degree of compressing and shearing, respectively, may thus be adapted to the individual construction in such a manner that a suitable spring constant and stiffness are obtained. By such an elastic portion, it is also possible to obtain a low stiffness against tilting, although the radial stiffness is relatively high. This reduces the loads onto the bearing member and prevents breaking between the inner ring and the outer ring of a roller bearing. Furthermore, such a frame member may be manufactured and mounted in a simple manner and with small dimensions, i.e. the frame member according to the invention requires a relatively small space.

According to an embodiment of the invention, the radially inner end of the first borderline of at least one of the intermediate elastic portions is located radially inside the radially inner end of the second borderline of this intermediate elastic portion. Furthermore, the radially outer end of the first borderline of at least one of the intermediate portions may by located radially inside the radially outer end of the second borderline of this intermediate elastic portion.

According to a further embodiment of the invention, at least one of said first borderlines slopes in relation to the axis of rotation and the extensions of the first borderlines, which extensions are directed outwardly from the axis of rotation, intersect. According to this embodiment, both the second, radially outer borderline and the first, radially inner borderline may slope in relation to the axis of rotation. In such a manner, the degree of compressing and shearing, respectively, may in a very simple and secure manner be determined by a suitable choice of a common angle of inclination or different angles of inclination of both the borderlines. Furthermore, by such an embodiment, a low stiffness against tilting and a high stiffness against radially movements may be obtained in a simple and secure manner.

According to an advantageous embodiment of the invention, the two intermediate elastic portions are arranged to extend about said axis of rotation. Furthermore, also the two first stiff portions may be arranged to extend about said axis of rotation as well as the two second stiff portions.

According to a further embodiment of the invention, each intermediate elastic portion is formed by a ring of a rubber-like material. By such an elastic or resilient portion of rubber, the support device may be realized in a simple manner.

According to a further embodiment of the invention, the two first borderlines are arranged to slope in relation to said axis of rotation by a respective angle of inclination. The absolute values of these angles of inclination may be different or substantially equal. Furthermore, the two second borderlines may be arranged to slope in relation to the axis of rotation by a respective angle of inclination. Also, the absolute values of the angle of inclination of the second borderlines may be different or substantially equal.

BRIEF DESCRIPTION OF THE DRAWINGS

The present invention is now to be explained by means of different embodiments described as examples and with reference to the drawings attached, in which FIG. 1 discloses schematically an axial sectional view of a part of a centrifugal separator having a support device according to a first embodiment of the invention.

FIG. 2 discloses an axial sectional view of a support device according to a second embodiment of the invention.

FIG. 3 discloses an axial sectional view of a support device according to a third embodiment of the invention.

DETAILED DESCRIPTION

Figure 1:
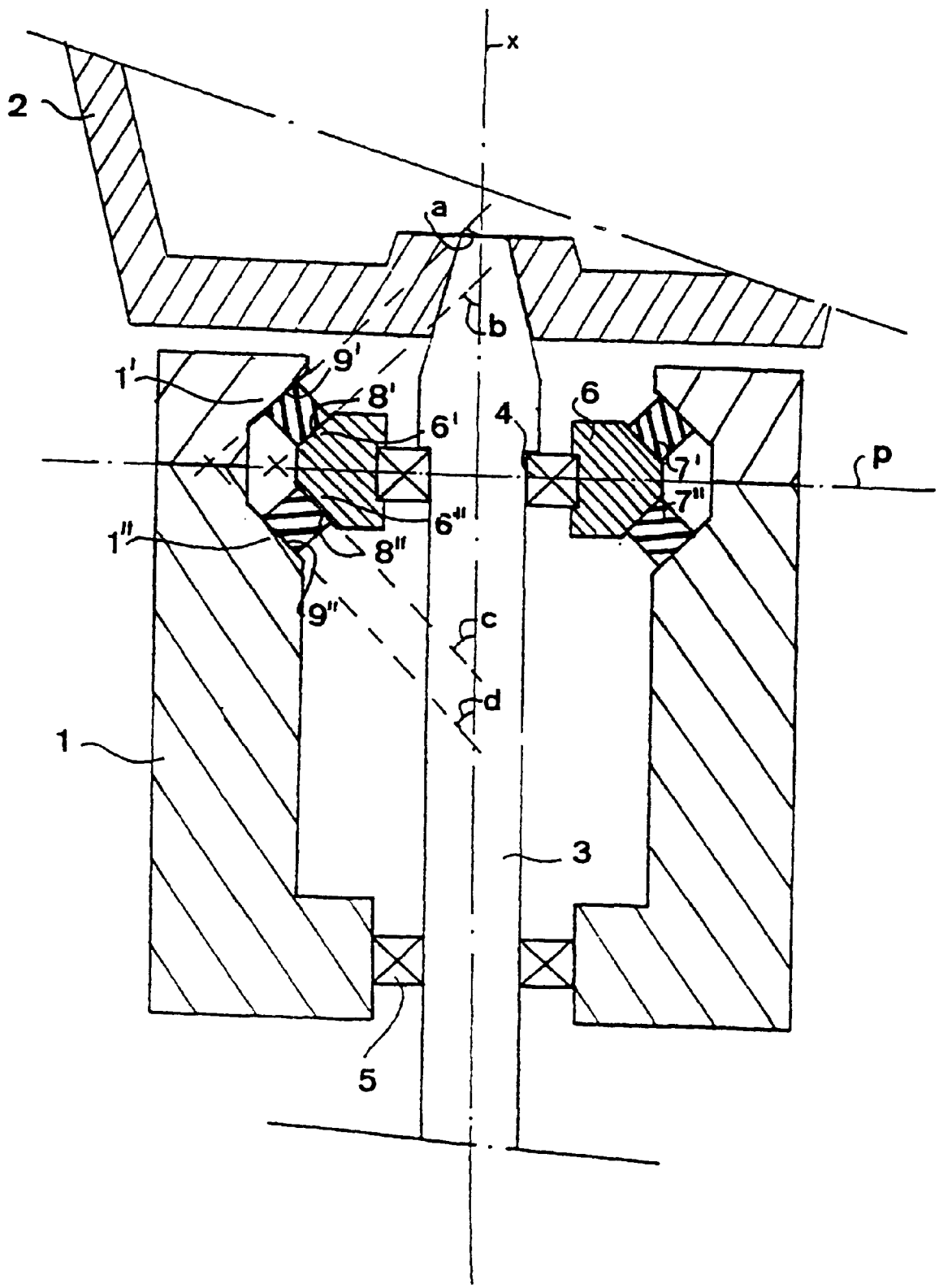

FIG. 1 discloses schematically a part of a centrifugal separator comprising a frame member 1 and a centrifuge rotor 2, which is fixedly connected to a rotor spindle 3. The centrifuge rotor 2 and the rotor spindle 3 are provided in the frame member 1 to be rotatable about an axis x of rotation by means of an upper bearing 4 and a lower bearing 5. The upper bearing 4 has a middle plane p forming a radial plane with respect to the axis x of rotation. The lower bearing 5 is in the example disclosed in direct contact with both the rotor spindle 3 and the frame member 1, whereas an inner bearing ring 4', see FIGS. 2 and 3, of the upper bearing 4 abuts the rotor spindle 3 and an outer bearing ring 4", see FIGS. 2 and 3, of the bearing 4 abuts an annular element 6, in the following called the bearing housing 6. The bearing housing 6 is connected to the frame member 1 by means of a support according to the present invention. The support is formed by the bearing housing 6, the frame member 1 and two elastic or resilient elements 7' and 7" provided between the bearing housing 6 and the frame member 1. In the example disclosed, each of the elastic elements 7' and 7" is shaped as a ring extending about the axis x of rotation and is manufactured of a rubber material. The elastic elements 7' and 7" are provided on a respective axial side of the middle plane p. Thus, the bearing housing 6 is substantially immovable in relation to the bearing 4 and the rotor spindle 3 with respect to radial and axial movements. Therefore, movements of the rotor spindle 3 will be transferred to the elements 7' and 7" which are designed to permit relative movements between the frame member 1 and the bearing housing 6.

The two elastic elements 7' and 7" adjoin, seen in an arbitrary axial section, the substantially inflexible or stiff bearing housing 6 along a first borderline 8' and 8", respectively. Furthermore, the two elastic elements 7' and 7" adjoin, seen in said axial section, the substantially inflexible or stiff frame member 1 along a second borderline 9', 9". In the example disclosed in FIG. 1, said borderlines slope in relation to the axis x of rotation by a respective angle a, b, c, d of inclination. The angles a and b of inclination are larger than 0° and less than 90°. The angles c and d of inclination lie within the same angle range but with the opposite sign. Consequently, this means that the radially outwardly directed extensions of the first borderlines 8', 8" will intersect as well as the radially outwardly directed extensions of the second borderlines 9', 9".

According to the first embodiment, the angles a and b are substantially equal as well as the angles c and d. In addition, the absolute value of the angles a and b is equal to the absolute value of the angles c and d. However, it is to be noted that this need not be the case but the angles a and b may be different as well as the angles c and d. In addition, the absolute values of the angles a and d need not be equal as well as the absolute values of the angles b and c.

As appears from FIG. 1, the second borderlines 9', 9" are located radially outside the first borderlines 8', 8". Furthermore, the radially inner end of the first borderline 8', 8" is located radially inside the radially inner end of the second borderline 9', 9" for each of the elastic elements 7', 7". Likewise, the radially outer end of the first borderline 8', 8" is located radially inside the radially outer end of the second borderline 9', 9" for each of the elastic elements 7', 7".

According to the first embodiment, the elastic elements 7', 7" are formed from the ring elements 7', 7" which are manufactured of rubber and melted together with the respective stiff portions 6', 6" and 1', 1" of the bearing housing 6 and the frame member 1, for instance by a vulcanization process.

FIG. 2 discloses a second embodiment of the present invention which differs from the first embodiment with respect to the attachment of the elastic element 7', 7" to the bearing housing 6 and the frame member 1, respectively. It is to be noted that the same reference signs have been used in all embodiments for elements having a corresponding or the same function. According to the second embodiment, the elastic elements 7', 7" are formed from a respective ring element 7', 7" which is manufactured of a rubber material and designed with two bevelled end portions which are arranged to be introduced into recesses of the bearing housing 6 and the frame member 1, respectively, In such a manner, the ring elements 7', 7" may be fixed in a position between the bearing housing 6 and the frame member 1. It is to be noted that the end portions of the ring elements 7', 7", which are located in the recesses of the bearing housing 6 and the frame member 1, respectively, will be substantially inflexible or stiff. This means that in the case of a relative movement between the frame member 1 and the rotor spindle 3, the ring elements 7', 7" will be deformed in the intermediate portion which is located outside the recesses of the bearing housing 6 and the frame member 1. The borderlines 8', 8" and 9', 9" between the elastic portions of the ring elements 7', 7" and the stiff portions of the bearing housing 6 and the frame member 1, respectively, in reality will extend between the corner points which are formed where the ring elements 7 contact the bearing housing 6 and the frame member 1, respectively. Radially inside the first borderline 8', 8" and radially outside the second borderline 9', 9", no deformation of the ring elements 7', 7" will take place.

The third embodiment, which is disclosed in FIG. 3, differs from the second embodiment which is disclosed in FIG. 2, in that the end portions of the ring elements 7', 7" are unsymmetrically shaped and have a first abutment surface extending essentially radially and to shorter second abutment surfaces extending axially, seen in an axial section, i.e. these second abutment surfaces extend along a cylindrical surface enclosing the axis x of rotation.

The present invention is not limited to the embodiments disclosed herein, but may be varied and modified within the scope of the following claims.

What is claimed is:

1. A centrifugal separator comprising a centrifuge rotor (2), a frame member (1) and a support device, said centrifuge rotor being provided in the frame member (1) to be rotatable about an axis (x) of rotation by means of at least one bearing member (4) having a middle plane (p), wherein the axis (x) of rotation is substantially perpendicular to the middle plane (p) of the bearing member (4), and the support device is provided between the at least one bearing member (4) and the frame member (1) and permits relative movements between the centrifuge rotor (2) and the frame member (1), the support device comprising two first substantially stiff portions (6', 6"), the two first substantially stiff portions being substantially immovable in relation to the at least one bearing member (4), two intermediate elastic portions (7', 7") and two second substantially stiff portions (1', 1"), the two second substantially stiff portions being substantially immovable in relation to the frame member (1), and wherein the two first substantially stiff portions seen in an axial section adjoin a respective intermediate portion (7', 7") along a first borderline (8', 8") and the two second substantially stiff portions seen in said axial section adjoin a respective intermediate portion along a second borderline (9', 9"), and further wherein at least one of said second borderlines (9', 9") slopes in relation to the axis (x) of rotation, and the extensions of the second borderlines intersect, the extensions being directed outwardly from the axis (x) of rotation, and the two intermediate portions (7', 7") are provided on a respective side of the middle plane (p).

2. The centrifugal separator according to claim 1, wherein the radially inner end of the first borderline (8', 8") of at least one of the intermediate elastic portions (7', 7") is located radially inside the radially inner end of the second borderline (9', 9") of the at least one of the intermediate elastic portions (7', 7").

3. The centrifugal separator according to claim 1, wherein the radially outer end of the first borderline (8', 8") of at least one of the intermediate elastic portions (7', 7") is located radially inside the radially outer end of the second borderline (9', 9") of the at least one of the intermediate elastic portions (7', 7").

4. The centrifugal separator according to claim 1, wherein at least one of said first borderlines (8', 8") slopes in relation to the axis (x) of rotation and the extensions of the first borderlines (8', 8") intersect, said extensions being directed outwardly from the axis (x) of rotation.

5. The centrifugal separator according to claim 1, wherein the two intermediate elastic portions (7', 7") are arranged to extend around said axis (x) of rotation.

6. The centrifugal separator according to claim 1, wherein the two first substantially stiff portions (6', 6") are arranged to extend around said axis (x) of rotation.

7. The centrifugal separator according to claim 1, wherein the two second substantially stiff portions (1', 1") are arranged to extend around said axis (x) of rotation.

8. The centrifugal separator according to claim 1, wherein each intermediate elastic portion (7', 7") is formed by a ring of a rubber-like material.

9. The centrifugal separator according to claim 1, wherein the two first borderlines (8', 8") are each arranged to slope in relation to said axis (x) of rotation by a respective angle (b, c) of inclination.

10. The centrifugal separator according to claim 9, wherein the absolute values of the angles (b, c) of inclination of the two first borderlines (8', 8") are substantially equal.

11. The centrifugal separator according to claim 1, wherein the two second borderlines (9', 9") are each arranged to slope in relation to said axis of rotation by a respective angle (a, d) of inclination.

12. The centrifugal separator according to claim 11, wherein the absolute values of the angles (a, d) of inclination of the two second borderlines (9', 9") are substantially equal.

13. The centrifugal separator according to claim 1, wherein said portions (1', 1", 6', 6", 7', 7") are substantially rotary symmetric.

14. In a centrifugal separator having a centrifuge rotor (2), and a frame member (1), said centrifuge rotor being provided in the frame member (1) to be rotatable about an axis (x) of rotation by means of at least one bearing member (4) having a middle plane (p), wherein the axis (x) of rotation is substantially perpendicular to the middle plane (p) of the bearing member (4), the improvement comprising a support device, said support device provided between the at least one bearing member (4) and the frame member (1) to permit relative movements between the centrifuge rotor (2) and the frame member (1), the support device comprising two first substantially stiff portions (6', 6"), the two first substantially stiff portions being substantially immovable in relation to the at least one bearing member (4), two intermediate elastic portions (7', 7") and two second substantially stiff portions (1', 1"), the two second substantially stiff portions being substantially immovable in relation to the frame member (1), and wherein the two first substantially stiff portions seen in an axial section adjoin a respective intermediate portion (7', 7") along a first borderline (8', 8") and the two second substantially stiff portions seen in said axial section adjoin a respective intermediate portion along a second borderline (9', 9"), and further wherein at least one of said second borderlines (9', 9") slopes in relation to the axis (x) of rotation, and the extensions of the second borderlines intersect, the extensions being directed outwardly from the axis (x) of rotation, and the two intermediate portions (7', 7") are provided on a respective side of the middle plane (p).

15. The support device according to claim 14, wherein the radially inner end of the first borderline (8', 8") of at least one of the intermediate elastic portions (7', 7") is located radially inside the radially inner end of the second borderline (9', 9") of the at least one of the intermediate elastic portions (7', 7").

16. The support device according to claim 14, wherein the radially outer end of the first borderline (8', 8") of at least one of the intermediate elastic portions (7', 7") is located radially inside the radially outer end of the second borderline (9', 9") of the at least one of the intermediate elastic portions (7', 7").

17. The support device according to claim 14, wherein at least one of said first borderlines (8', 8") slopes in relation to the axis (x) of rotation and the extensions of the first borderlines (8', 8") intersect, said extensions being directed outwardly from the axis (x) of rotation.

18. The support device according to claim 14, wherein the two intermediate elastic portions (7', 7") are arranged to extend around said axis (x) of rotation.

19. The support device according to claim 14, wherein the two first substantially stiff portions (6', 6") are arranged to extend around said axis (x) of rotation.

20. The support device according to claim 14, wherein the two second substantially stiff portions (1', 1") are arranged to extend around said axis (x) of rotation.

21. The support device according to claim 14, wherein each intermediate elastic portion (7', 7") is formed by a ring of a rubber-like material.

22. The support device according to claim 14, wherein the two first borderlines (8', 8") are each arranged to slope in relation to said axis (x) of rotation by a respective angle (b, c) of inclination.

23. The support device according to claim 22, wherein the absolute values of the angles (b, c) of inclination of the two first borderlines (8', 8") are substantially equal.

24. The support device according to claim 14, wherein the two second borderlines (9', 9") are each arranged to slope in relation to said axis of rotation by a respective angle (a, d) of inclination.

25. The support device according to claim 24, wherein the absolute values of the angles (a, d) of inclination of the two second borderlines (9', 9") are substantially equal.

26. The support device according to claim 14, wherein said portions (1', 1", 6', 6", 7', 7") are substantially rotary symmetric.

* * * * *